(12) United States Patent
Dick

(10) Patent No.: US 7,609,742 B2
(45) Date of Patent: Oct. 27, 2009

(54) STAR CONFIGURATION OPTICAL RESONATOR

(75) Inventor: David Dick, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 423 days.

(21) Appl. No.: 11/164,907

(22) Filed: Dec. 9, 2005

(65) Prior Publication Data

US 2007/0133646 A1 Jun. 14, 2007

(51) Int. Cl.
*H01S 3/091* (2006.01)
*H01S 3/08* (2006.01)

(52) U.S. Cl. .............................. 372/70; 372/92; 372/95; 372/98

(58) Field of Classification Search ............. 372/70–72, 372/69, 75, 92, 95, 98–99
See application file for complete search history.

(56) References Cited

U.S. PATENT DOCUMENTS 4,093,924 A * 6/1978 Farcy .......................... 359/347
4,779,286 A * 10/1988 Wheatley ...................... 372/93
4,907,235 A * 3/1990 Kuizenga ...................... 372/21
5,870,421 A * 2/1999 Dahm .......................... 372/75
6,222,869 B1 * 4/2001 Marshall et al. ............... 372/75
6,339,605 B1 1/2002 Vetrovec
6,603,793 B2 * 8/2003 Vetrovec ...................... 372/95
6,621,849 B1 * 9/2003 Thro et al. .................... 372/99
6,625,193 B2 9/2003 Vetrovec
6,810,060 B2 10/2004 Vetrovec
6,888,872 B2 * 5/2005 Vetrovec ...................... 372/95
7,233,611 B2 * 6/2007 Mukaihara et al. ............ 372/72
2003/0198265 A1 * 10/2003 Vetrovec ...................... 372/35

OTHER PUBLICATIONS

John Vetrovec, "Active Mirror Amplifier for High-Average Power," Proceedings of SPIE, vol. 4270, (2001).

* cited by examiner

*Primary Examiner*—Minsun Harvey
*Assistant Examiner*—Phillip Nguyen
(74) *Attorney, Agent, or Firm*—Charles L. Moore; Moore & Van Allen, PLLC

(57) ABSTRACT

An optical resonator has an internal cavity with an output coupler, an end mirror, and one or more active mirror amplifiers (AMAs) that are arranged in a manner to form a laser radiation propagation path within the cavity which substantially has the form of a star polygon trajectory.

20 Claims, 5 Drawing Sheets

STAR CONFIGURATION OPTICAL RESONATOR

TECHNICAL FIELD

This invention relates to the field of pumped solid state lasers (SSLs), and more particularly to pumped SSLs which use active mirror amplifier (AMA) modules as the laser gain medium.

BACKGROUND ART

As known, a solid-state laser (SSL) extracts coherent light from an inverted population of neodymium, ytterbium, or other suitable ions doped into the SSL gain medium of an optical resonator. This population inversion is created by optically exciting the dopant ions by pumping them with optical radiation at wavelengths shorter than the laser wavelength. The pumping raises the laser atoms to an upper energy level, thereby increasing the laser power. The pumping, however, also generates heat that creates transverse temperature gradients within the SSL gain medium. These temperature gradients can distort the optical phase front of the laser and degrade beam quality, thereby limiting the resonator's ability to produce near diffraction-limited beam quality (BQ).

There is, however, a class of SSL gain medium known as "active mirror amplifier" (AMA) which exhibit lower transverse temperature gradient characteristics and are capable of providing good laser BQ in high average power (HAP) SSL applications (in excess of 200 watts). These AMA gain mediums have several known configurations. One such type is disclosed in U.S. Pat. No. 6,339,605 to Jan Vetrovec, entitled Active Mirror Amplifier System and Method for a High-Average Power Laser System, which is incorporated herein by reference. It uses a large-aperture solid-state laser gain medium disk which is about 2.5 millimeter (mm) thick, with a selectable diameter of from 5 to 15 centimeter (cm) diameter, and which is mounted on a rigid substrate, or optical bench. The substrate is cooled by a gas or liquid medium that circulates in microchannels embedded in the interior of the substrate, which in turn keeps the gain medium disk cool.

An alternative AMA is disclosed in U.S. Pat. No. 6,625,193 to Jan Vetrovec, entitled Side-Pumped Active Mirror Solid-State Laser for High-Average Power, which is also incorporated herein by reference. There a large aperture gain medium disk is optically pumped by radiation injected into the peripheral edge of the disk. Side-pumping takes advantage of the long absorption path (approximately the same dimension as the disk diameter), which permits doping the disk with a reduced concentration of lasant ions, and provides a corresponding reduction in required pump radiation intensity, and heat. A further alternative type AMA is shown in U.S. Pat. No. 6,810,060 to Jan Vetrovec, entitled High-Average Power Active Mirror Solid-State Laser with Multiple Subapertures, which is also incorporated herein by reference. Once again the gain medium disk is attached to a cooled, rigid substrate as in the '605 patent, but here the large optical aperture of the disk is filled with multiple AMA subapertures.

Each of these different type AMA gain medium allow for generation of a near diffraction limited laser output from the AMA at very high average power. A HAP SSL optical resonator can then be achieved by combining several of these AMA gain medium modules within the resonator cavity. In the prior art this is achieved by optical resonators which have a linear or a circular optical resonator configuration. Each of these configurations, however, require relatively large optical cavities to ensure adequate beam quality (BQ). In linear resonators the cumulative beam propagation path length required for the laser to travel between AMA modules adds significantly to the overall length and weight of the resonator. Alternatively, circular optical resonators present a high angle of incidence to the laser radiation at the gain medium optical surface, making water cooling of the AMA more complex. This too adds size and weight to the resonator structure. The larger size and weight of the linear and circular resonator structures also cause them to lose optical bench stiffness, further contributing to resonator instability.

There is therefore a need for an optical resonator configuration which overcomes the size and weight disadvantages of the prior art linear and circular AMA optical resonators, and which more readily provides the ability to scale the resonator to higher output power with greater numbers of AMA modules than is possible with prior art resonators.

DISCLOSURE OF INVENTION

The present invention is to an AMA SSL optical resonator in which the optical elements are positioned around the perimeter of the optical cavity in a manner which provides the laser radiation within the cavity with a propagation path trajectory having a low angle of incidence at each AMA active surface, thereby permitting higher efficiency AMA cooling and higher output power per unit size than prior art AMA SSL resonators.

According to the present invention, a plurality of optical elements are disposed in a circumferential array along the perimeter of the cavity, each in an allocated one of a plurality of substantially equally spaced perimeter segments, and each cooperatively aligned to receive and transmit laser radiation through the cavity along a propagation path substantially in the form of a star polygon.

In further accord with the invention, there are N number of optical elements, including an outcoupler, an end mirror, and one or more active mirror amplifier (AMA) modules, disposed in a circumferential array at substantially equal spaced intervals along the perimeter of the cavity, each of the N number of elements being positioned and cooperatively aligned therein to exchange laser radiation with first and second others of the N number of elements which are positioned X number of the perimeter segments clockwise and counterclockwise, respectively, therefrom in the circumferential array, the N number and the X number being relatively prime numbers, whereby the N number of optical elements circulate laser radiation through the cavity along a propagation path substantially in the form of an {N, X} star polygon. In still further accord with the present invention, the relationship of the number of optical elements N, to the number X of perimeter intervals between those optical elements which exchange laser radiation, is that X is the largest relatively prime number <N/2.

In yet still further accord with the invention, each AMA module includes at least one, actively cooled solid-state laser gain medium arranged in an active mirror configuration, and a pump for providing optical pump radiation into the laser gain medium for excitation thereof.

In yet still further accord with the invention, the optical resonator may be provided in a cascaded arrangement, for higher power SSL, in which the optical elements are arranged in two or more groups within the optical cavity, including at least a first group and a last group, each having N number of optical elements, the first group including an outcoupler and one or more active mirror amplifier (AMA) modules, and the second group including an end mirror and one or more AMA modules, the N number of elements in each group being disposed in a planar circumferential array, in a group common tier, in substantially equal perimeter segments of the cavity, the N optical elements of each group being cooperatively aligned within their group common tier to exchange laser radiation with first and second others of the N number of elements that are positioned X number of perimeter segments clockwise and counterclockwise, respectively, therefrom in the group common tier, the N number and the X number being relatively prime numbers, whereby laser radiation is circulated within each the group common tier along a propagation path substantially in the form of an {N, X} star polygon, and where at least one AMA module in each the group common tier is aligned out of the plane of its circumferential array to exchange laser radiation with a mating AMA in another group common tier, where amplification of the laser energy within the cavity occurs with circulation of the laser energy through the AMA modules of each of the several common group tiers.

The common tier and cascaded optical resonator configurations of the present invention are capable of providing a high power SSL signal within a structure which optimizes both weight and volume efficiencies while further optimizing AMA cooling. It does this by causing the laser light to travel among the resonator's optical elements in a modified star polygon propagation path, which provides the light with a low optical angle of incidence at each AMA surface. The result is an optical resonator structure which is more easily transportable.

These and other objects, features, and advantages of the present invention will become more apparent in light of the following detailed description of embodiments thereof, as illustrated in the accompanying Drawings.

DESCRIPTION OF A BEST MODE EMBODIMENT

The present invention is to an optical resonator capable of providing a HAP SSL in a more highly compact resonator structure than that available in the prior art. The result is a lighter weight, smaller sized device that is more suitable for portable applications than prior art optical resonators. It does this with a cavity arrangement of optical elements that present the laser radiation with shorter transmission distances between elements, and which present the radiation itself at a more shallow angle of incidence to the element's active surface. The shorter transmission distances make the resonator less sensitive to mirror alignment and more practical for integration onto mobile platforms. The shallow angle of incidence permits more efficient AMA cooling, thereby allowing for greater output power while maintaining good BQ.

These benefits are realized by providing the cavity with a laser radiation propagation path which is substantially in the form of a {P, Q} star polygon. As known, a {P, Q} star polygon is a star-like geometric figure formed by interconnecting a modulus P number of equally spaced points along a circumference. It is formed by connecting a first point to another, non-adjacent point, located some Q number of points away (Q>1) along the circumference. The first point is then connected by a line to this $Q^{th}$ point. That point is then connected by line to the next succeeding $Q^{th}$ point, and so one until the original point is reached and the geometric figure is closed. P and Q are each relatively prime numbers (i.e. positive integers (p>1) that have no common positive integer divisors other than 1). The number Q, sometimes referred to as the "density" of the star polygon, is greater than 1 and less than P−1, or 1<Q<P−1.

Figure 7:
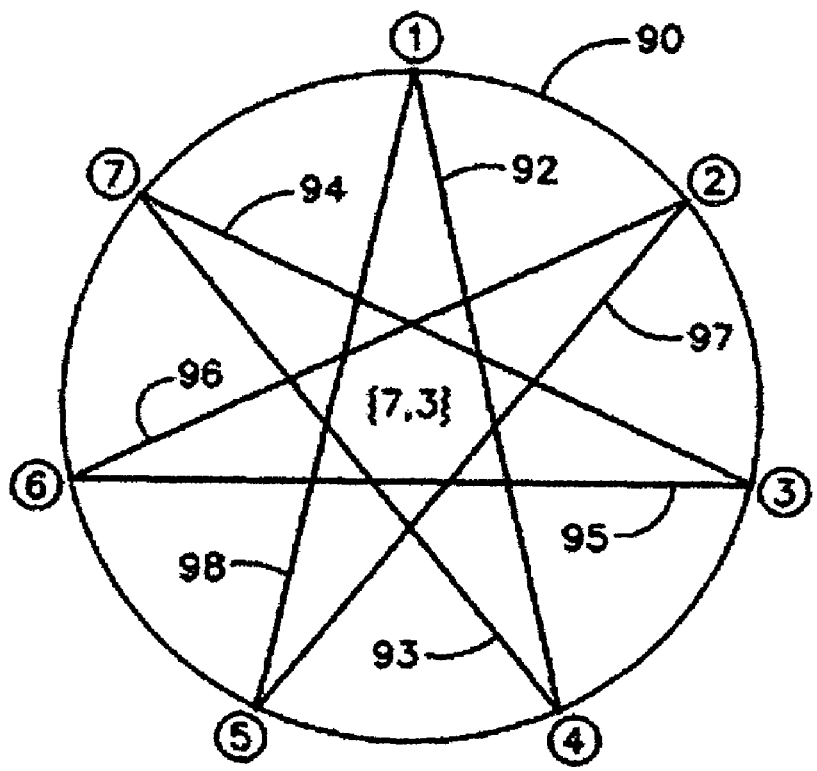
FIG. 7 is an illustration of a {p/q} star polygon used in the teaching of the invention.

FIG. 7 is an example of a {7, 3} star polygon, where there are seven points (numbered 1 through 7) that are spaced along a circumference 90. The polygon is formed by connecting each point to a point that is the next $3^{rd}$ point along the circumference. Since the polygon closes on itself it doesn't matter if you count clockwise or counterclockwise. In this example, beginning with point number 1 and counting clockwise, the next $3^{rd}$ point is point number 4, and points 1 and 4 are connected by line 92. The next $3^{rd}$ point from point 4 is point 7 and points 4 and 7 are connected by line 93. The process continues with lines 94-97 until point 5 is reached, which then connects through line 98 to point 1 to close the figure.

Figure 1:
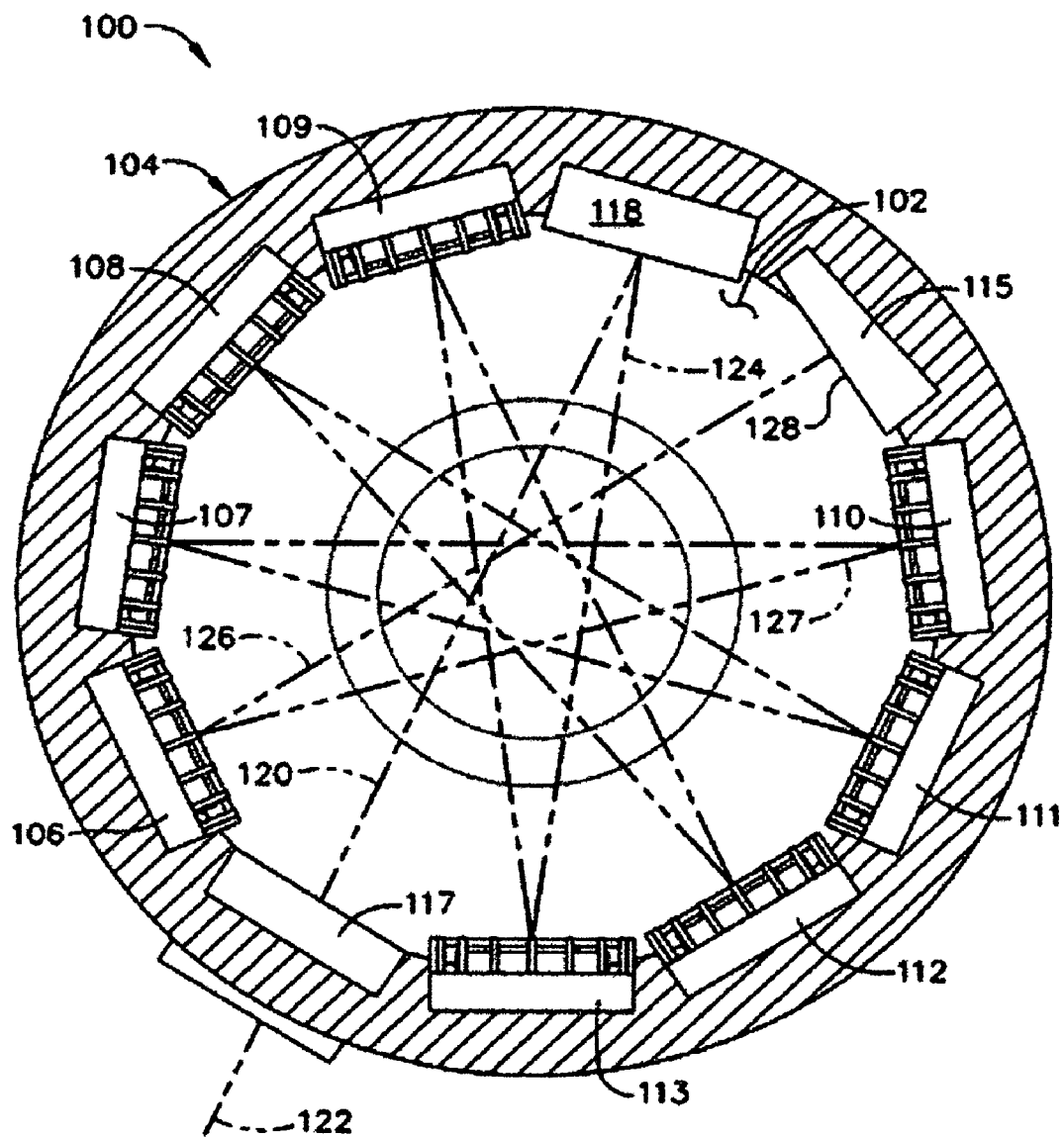
FIG. 1 is a plan view of one embodiment of a single tier optical resonator according to the present invention.

Referring now to FIG. 1, in a plan view of an exemplary embodiment of an optical resonator 100 according to the present invention, the resonator 100 includes a cavity 102 formed within a resonator housing 104. The housing 104 defines the perimeter of the cavity 102 and serves as the optical bench to which optical elements may be mounted. In the FIG. 1 embodiment there are eleven optical elements (N=11), including a laser gain medium comprising active mirror modules (AMA) modules 106-113, placed in a linear unstable resonator formed by a highly reflecting end mirror 115 and an outcoupler and feedback assembly 117. In this embodiment a highly reflecting mirror 118 is used to receive and transmit laser radiation from and to the outcoupler and feedback assembly 117. This, however, is a design discretion, and not a limitation on the present resonator configuration, or the invention itself. If so elected, the mirror 118 may alternatively be another AMA module.

The elements 106-118 are placed at substantially equal intervals around the perimeter of the cavity 102, in a circumferential array. They are fixed in position in substantially the same plane within the cavity, with their active surfaces facing the cavity center. In a preferred embodiment the elements are mounted to the housing 104 to provide good bench stiffness. Alternatively, if permitted in a given application the elements may be standalone mounted in their circumferential array. Similarly, for simplicity of illustration in FIG. 1, the electrical and coolant connections to the pump diodes and gain medium of the AMA modules 106-113 are not shown.

In this circumferential array the elements 106-118 are similarly positioned to the points, or vertices, of a {P, Q} star polygon. Applying the star polygon construct described earlier with respect to FIG. 7, to the FIG. 1 embodiment, the modulus P is the number of optical elements in the cavity. In the FIG. 1 embodiment there are 11 elements, and 11 is a prime number. The density value Q, is an elected number. It must be a relatively prime number, greater than 1 and less than P/2. For P=11, that leaves 2, 3, 4, and 5. In the present invention, the density value Q is chosen to provide the laser with the most shallow angle of incidence at the active surfaces of the elements. It can be shown by graphical analysis that from among the four possible values that Q=5 provides the optimum angle. Therefore, the object of the FIG. 1 embodiment is to position and mutually align the optical elements 106-118 to provide an {11, 5} star polygon path trajectory for the laser radiation circulating through the cavity 102.

The relative placement of the outcoupler 117 and end mirror 118 may be determined beginning with the outcoupler 117, which reflects a portion 120 of the amplified laser 122 to the active surface of the highly reflecting mirror 118 located five positions further clockwise along the cavity perimeter from the outcoupler. The mirror 118, reflects about 99.9% of the radiation incident at its surface along path 124 to the AMA module 113, which is a further five positions clockwise along the cavity perimeter. The propagation path continues in sequence as it is received, amplified, and retransmitted by modules 109, 112, 108, 111, 107, 110, and 106, each separated five positions clockwise from the other, until the path segment 126 reaches the end mirror 115.

The active surface 128 of the end mirror 115 is angled at a value 4), to position the surface normal to the incident laser radiation, which otherwise arrives at the surface at the angle of incidence established by the star polygon path trajectory. With the surface biased to this normal position, the laser radiation is reflected back along the path 126 toward AMA module 106. In this reverse direction AMA module 106 receives, amplifies, and retransmits the radiation along path 127 to AMA module 110 located five positions counterclockwise along the perimeter of the cavity. The recycled laser radiation propagates in reverse as it is received, amplified, and retransmitted in sequence by AMA modules 110, 107, 111, 108, 112, 109, and 113 back to mirror 118 and to the outcoupler 117.

As may be apparent, the laser propagation path of the present invention differs from a true geometric star polygon in that it is not a continuous closed figure. In its application here laser radiation circulates along the polygon path between end points established by the outcoupler 117 and end mirror 115. They bound the laser gain medium and represent the terminal ends of the resonator. This of course is necessary to the function of the linear resonator, and represent the invention's adaptation of the star polygon geometry for optical resonator use. For this reason the present propagation path is alternately referred to as being substantially in the form of a star polygon, or a modified star polygon. Also, as an aide in describing the invention and its embodiments, the star polygon vertices at which the outcoupler and end mirror end points are positioned, are referred to here as the terminal vertices of the laser star polygon propagation path.

Figure 5:
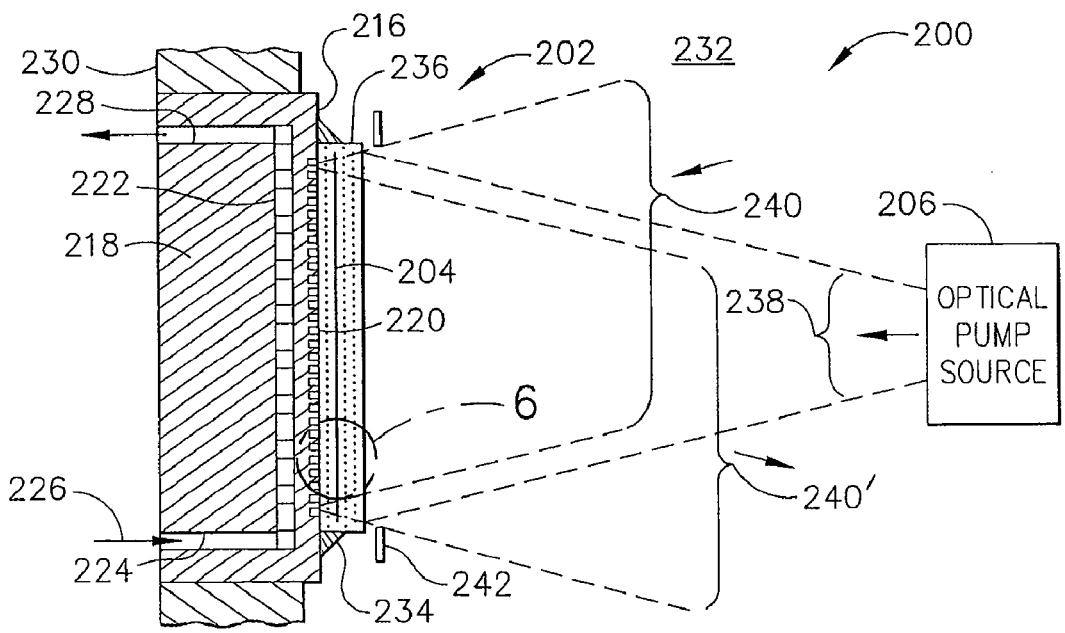
FIG. 5 is a side cross sectional view of an active mirror amplifier (AMA) module used in the embodiments of FIGS. 1-3.
Figure 6:
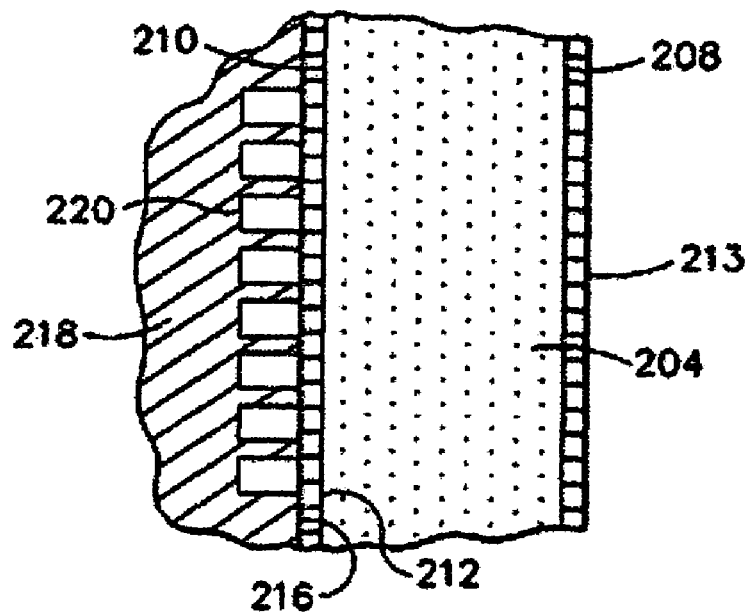
FIG. 6 is an enlarged section view of a portion of FIG. 5.

The AMA modules 106-112 amplify the laser radiation by diode pumping. Referring simultaneously now to FIG. 5, an elevated side section of AMA module 200, and FIG. 6, an enlarged portion of the section of FIG. 6, which exemplifies the embodiment of AMA modules 106-112 of FIG. 1. The AMA module 200 comprises an active mirror assembly 202 and an optical pump source 206. The active mirror assembly 202 includes a solid-state laser gain medium 204, having front surface 208 and back surface 210, as shown in the FIG. 6 enlarged segment. These surfaces are mutually parallel. The shape of the laser gain medium 204 may vary but in a preferred embodiment comprises a circular disk with a diameter "D", which is several times greater than its thickness "T".

The back surface 210 has a dielectric optical coating 212 which is highly reflective at the laser wavelength and the wavelength of the optical pump source 206. The front surface 208 has a dielectric optical coating 213 that is antireflective at the laser wavelength and the optical pump wavelength. The back surface 210 is in contact with a surface 216 of a cooled, rigid substrate 218. The surface 216 contains an array of interconnected vacuum microchannels 220 extending generally over, but not beyond, the contact area between the laser gain medium 204 and the rigid substrate 218.

The substrate 218 contains a heat exchanger 222, which is located behind the surface 216, but not connected to the vacuum microchannels 220. Coolant 226 flows through the heat exchanger 222, from inlet header 224 to outlet header 228, to provide uniform cooling of the back surface 210 of the laser gain medium disk 204. Suitable coolants may include deionized water, alcohol, members of the Freon® family, and liquid nitrogen.

The substrate 218 is made of a material having good thermal conductivity, and a coefficient of thermal expansion close to that of the laser gain medium disk 204. In the preferred embodiment copper is used, however, such other materials as are deemed by those skilled in the art to have satisfactory thermal conductivity may also be used. Surface 216 of substrate 218 is machined to optical flatness except for the penetrations created by the microchannels 220, which occupy approximately half the contact area between surface 216 of substrate 218 and the back surface 210 of laser gain medium disk 204. The thickness of the substrate 218 is chosen to provide mechanical rigidity necessary to ensure that the surface 216 remains optically flat under operational conditions.

Positive contact between the back surface 210 of laser gain medium disk 204 and surface 216 of the substrate 218 is maintained by a pressure differential between the higher pressure of the atmosphere 232 surrounding the mirror assembly 202 and the lower pressure inside the microchannels 220. Such continuous contact ensures that the back surface 210 remains optically flat under thermal load by conductive transfer of the heat from the gain medium disk 204 to the substrate 218.

The substrate 218 is installed in an optical mount 230 which facilitates easy positioning and alignment of its active surface within the cavity 102 (FIG. 1). In addition to the seal provided by the contact between the surfaces 210 and 216, the microchannels 220 are also sealed from atmosphere 232 by an elastomeric bond 234, located between the perimeter surface 236 of gain medium disk 204 and the surface 216. Suitable materials for the elastomeric bond 234 include RTV, RTM, and silicon rubber. Alternatively, other forms of compliant seals, such as an O-ring may also be used.

In operation, the optical pump source 206, which preferably comprises an array of laser diodes, produces and directs a collimated optical beam 240, with pump radiation 238 into the front surface 208 of the gain medium disk 204. During passage through the gain medium 204 the optical pump radiation 238 is gradually absorbed by dopant species in the gain medium. These dopant species pump the radiation to a laser transition. The beam 240, is generally incident normal to front surface 208, and is amplified until it reaches the dielectric coating 212, where it is reflected and passes through the gain medium 204 a reverse direction, and exits as output laser beam 240' in a direction substantially normal to the front surface 208. Heat dissipated in the laser gain medium disk 204 is conducted to back surface 210 and through the dielectric coating 212, and transferred to surface 216 of the substrate 218 from which it is conducted to the heat exchanger 222.

In the present invention the size of the optical resonator in terms of its number of optical elements, may vary as necessary to satisfy functional requirements, such as output power or physical limitations on size and weight. In each instance, however, the polygon-like shape formed by the optical elements must be odd sized, i.e. a polygon-like shape having an odd number of sides so as to provide the laser beam with a modified star polygon propagation path through the optical resonator cavity 102. Also, to ensure a suitable low optical angle of incidence of the laser light to the AMA modules the separation X of the vertices for an N point modified star polygon propagation path is are preferred to be equal to $X=(N-1)/2$, so that resonators that are larger than the {11, 5} star polygon configuration of FIG. 1 may include {13, 6}, {15, 7} and so on until a practical limit is reached. The smallest resonator is limited to a five sided polygon-like shape {5, 2}, which produces a modified star polygon in the form substantially similar to a standard five point star.

Figure 2:
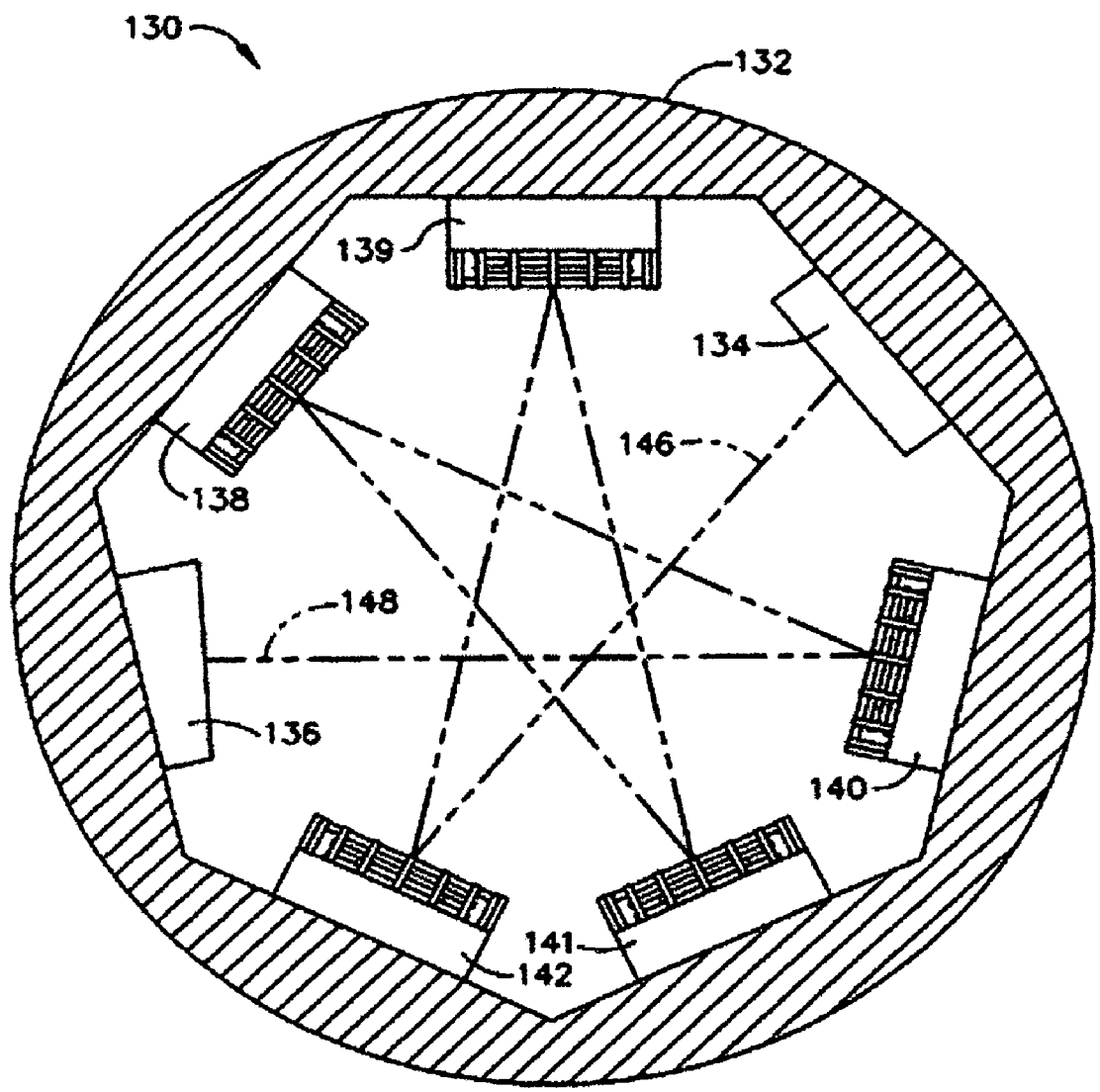
FIG. 2 is a plan view of an alternate embodiment of a single tier optical resonator according to the present invention.

The resonator 100 of FIG. 1 is a single tier structure where the resonator and gain medium are mounted in a common plane within the cavity. Where it is impractical to provide a single tier optical resonator large enough to achieve the desired SSL output power, it is possible to cascade two or more smaller resonators in a stacked arrangement in which the cascaded resonators each form separate layers, or tiers of a single resonator housing. Referring now to FIG. 2, which is a plan view of an optical resonator 130, with a housing 132 which encloses an output coupler mirror 134, an end mirror 136, and AMA modules 138-142. As in the case of the FIG. 1 embodiment, for simplicity of illustration, the electrical and coolant connections to the pump diodes and gain medium of the AMA modules 138-142 are not shown.

The optical elements are positioned in a common plane, in a seven sided polygon-like arrangement. The optical side of each optical element is directed inwards such that it faces the other optical elements, and are relatively orientated to provide a {7, 3} modified star polygon propagation path. In operation laser light enters through an output coupler mirror 134 and propagates along path segment 146 to AMA module 142. The AMA module 142 reflects the pumped laser to AMA 139 positioned three counts further clockwise, which in turn reflects the light intensified laser through AMAs 141, 138, and 140 through end path segment 148 to end mirror 136. There the laser is reflected back through the laser gain medium along a reverse propagation of the same modified star polygon propagation path.

Figure 3:
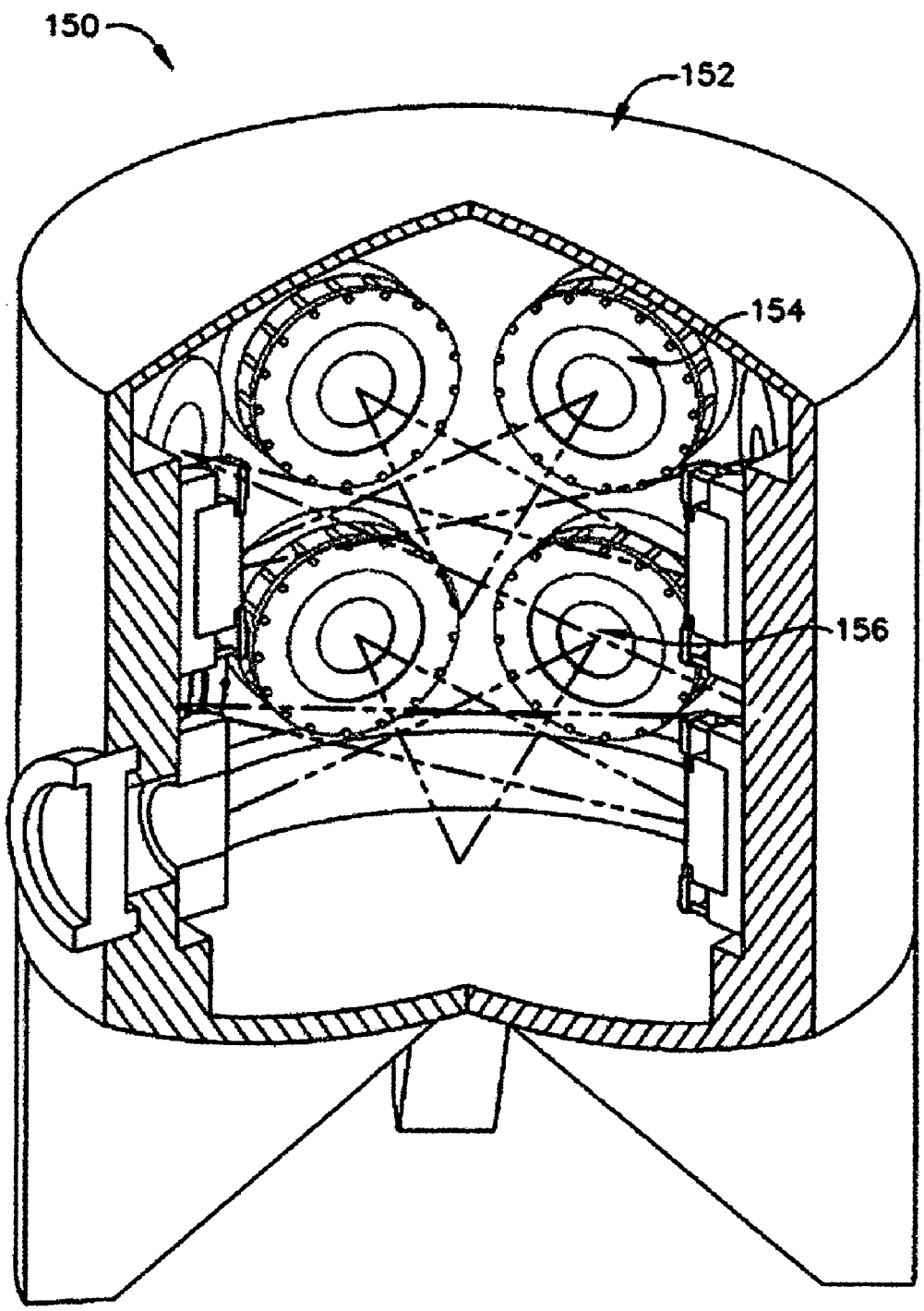
FIG. 3 is a perspective illustration, partially in section, of an embodiment of an optical resonator that is a ganged arrangement of two or more single tier optical resonators connected in cascade.
Figure 4:
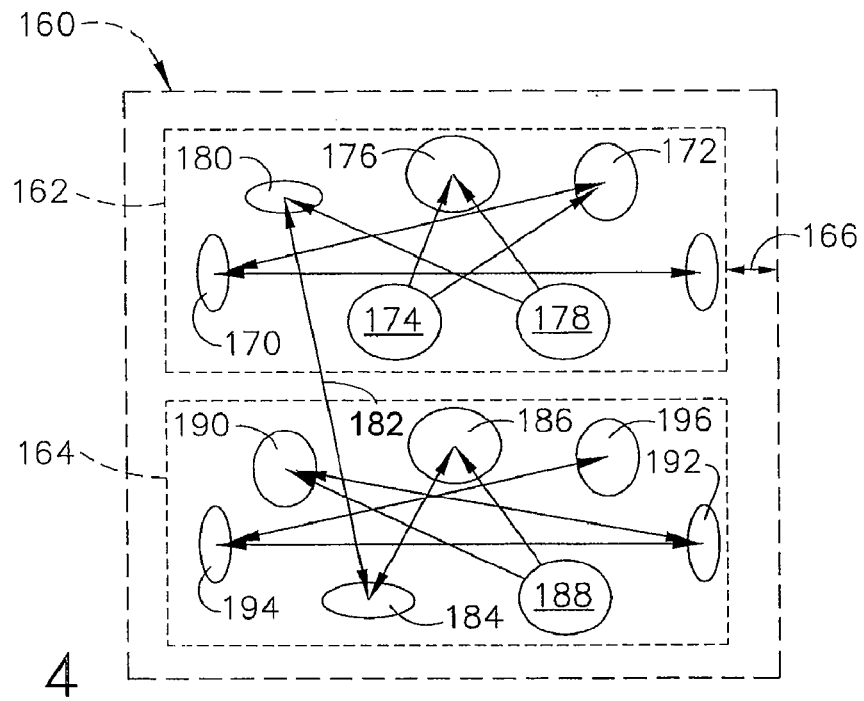
FIG. 4 is a simplified schematic illustration of the principal of operation of the optical resonator embodiment of FIG. 3.

FIG. 3 is a perspective illustration, partially in section, of an optical resonator 150, with housing 152, which is a ganged arrangement of two or more single tier optical resonators 154, 156 connected in cascade. Each of the single tier optical resonators are the same as those shown in the embodiments of FIGS. 1 and/or 2, but having one of the AMAs or, alternatively, a highly reflecting mirror, in each tier tilted out of the plane of the star polygon to redirect the optical beam from one tier to the other. FIG. 4 is a simplified schematic illustration of the ganged arrangement in which optical resonator 160 comprises a ganged arrangement of first and second single tier optical resonators 162 and 164. The resonators 162, 164 are assumed to be configured to provide a {7, 3} modified star polygon propagation path.

In operation, a laser light pulse 166 enters an output coupler mirror 168 of resonator 162 and in the {7, 3} modified star polygon propagation path is directed through AMA modules 170-178 to AMA module 180, which is tilted out of plane to direct the laser beam 182 to the AMA module 184 of the optical resonator 164. AMA module 184 is tilted out of plane in complement to the AMA module 180 so that they face each other. Within the optical resonator 164 the laser beam 182 follows the {7, 3} modified star propagation path through AMA modules 186-194 to an end mirror assembly 196, where it is reflected back on itself and reverse propagation through the gain mediums of both optical resonators 162, 164 and exits as intensified laser light beam 166.

The described {11,5} and {7,3} single tier resonator embodiments of FIGS. 1 4 are only two examples in which the modified star polygon path trajectory may be implemented. The present invention can also be applied to other modified star polygons, such as: {5,2}, {7,3}, {9,4}, {13,6}, {15,7} and {17,8}. Currently, there are physical constraints preventing an optical resonator having a modified star polygon shape to be larger than a {17,8}. These constraints include sensitivities to angular misalignments, which is a function of the total optical path length and optical element diameter. However, the present invention is not intended to be limited by the current physical constraints. The present invention may be applied in the future to optical resonators having a modified star polygon configuration larger than {17,8}.

Although the invention has been shown and described with respect to the disclosed embodiments thereof, it should be understood by those skilled in the art that various changes, omissions, and additions may be made to the form and detail of the disclosed embodiments without departing from the spirit and scope of the invention, as recited in the following claims.

What is claimed is:

1. A linear optical resonator, comprising:
an optical cavity, for amplifying laser radiation; and
a plurality of optical elements disposed in a circumferential array along the perimeter of said cavity, each in an allocated one of a plurality of substantially equally spaced perimeter segments, and each cooperatively aligned to receive and transmit laser radiation through said cavity along a propagation path substantially in the form of a star polygon, wherein said circumferential array of said plurality of optical elements comprises an outcoupler, an end mirror, and one or more active mirror amplifier (AMA) modules, each of said plurality of elements being positioned along the cavity perimeter at an associated one of a like plurality of vertices of said star polygon laser propagation path, said outcoupler and said end mirror being positioned at terminal vertices of said star polygon propagation path for circulating the laser radiation therebetween, and said AMA modules being arranged in operating relationship to one another at vertices intermediate thereto for amplifying the laser radiation cycling between said outcoupler and said end mirror.

2. The linear optical resonator of claim 1, where the laser radiation is transmitted through said cavity at a cavity wavelength.

3. The linear optical resonator of claim 2, wherein each of said plurality of optical elements is positioned in said circumferential array at an associated one of a like plurality of vertices of said star polygon laser propagation path.

4. The linear optical resonator of claim 1, wherein said plurality of optical elements further include a highly reflective mirror which is cooperatively aligned in said circumferential array to exchange laser radiation between said outcoupler and said AMA modules.

5. The linear optical resonator of claim 1 wherein the sum number of said plurality of optical elements is a prime number.

6. The linear optical resonator of claim 5, wherein each said AMA module includes at least one, actively cooled solid-state laser gain medium arranged in an active mirror configuration, and a pump for providing optical pump radiation into said laser gain medium for excitation thereof.

7. The linear optical resonator of claim 5, wherein:
said prime number is N; and
each of said N number of optical elements are aligned in said circumferential array to exchange laser radiation with first and second others of said N number of elements which are positioned X number of said perimeter segments clockwise and counterclockwise, respectively, therefrom in said circumferential array, said N and X numbers being relatively prime numbers, and said laser propagation path being substantially in the form of an {N, X} star polygon.

8. The linear optical resonator of claim 7, where X=(N−1)/2.

9. The linear optical resonator of claim 8, where N=11 and X=5.

10. The linear optical resonator of claim 9, wherein said optical cavity is unstable.

11. A liner optical resonator, comprising:
an optical cavity, for amplifying laser radiation; and
N number of optical elements, including an outcoupler, an end mirror, and one or more active mirror amplifier (AMA) modules, disposed in a circumferential array at substantially equal spaced intervals along the perimeter of said cavity, each of said N number of elements being positioned and cooperatively aligned therein to exchange laser radiation with first and second others of said N number of elements which are positioned X number of said perimeter segments clockwise and counterclockwise, respectively, therefrom in said circumferential array, said N number and said X number being relatively prime numbers, whereby said N number of optical elements circulate laser radiation through said cavity along a propagation path substantially in the form of an {N, X} star polygon.

12. The linear optical resonator of claim 11, where X=(N−1)/2.

13. The linear optical resonator of claim 12, where N=11 and X=5.

14. The linear optical resonator of claim 13, wherein said optical cavity is unstable.

15. The linear optical resonator of claim 13, wherein said plurality of optical elements further includes a highly effective mirror which is cooperatively aligned in said circumferential array to exchange laser radiation between said outcoupler and said AMA modules.

16. The linear optical resonator of claim 11, wherein each said AMA module includes at least one, actively cooled solid-state laser gain medium arranged in an active mirror configuration, and a pump for providing optical pump radiation into said laser gain medium for excitation thereof.

17. A linear optical resonator, comprising:
an optical cavity, for amplifying laser radiation; and
a plurality of optical elements arranged in two or more groups, including at least a first group and a last group, each having N number of optical elements, said first group including an coupler and one or more active mirror amplifier (AMA) modules and said last group including an end mirror and one or more AMA modules, said N number of elements in each group being disposed in a planar circumferential array, in a group common tier, in substantially equal perimeter segments of said cavity, said N optical elements of each group being cooperatively aligned within their group common tier to exchange laser radiation with first and second others of said N number of elements that are positioned X number of said perimeter segments clockwise and counterclockwise, respectively, therefrom in said group common tier, said N number and said X number being relatively prime numbers, whereby laser radiation is circulated within each said group common tier along a propagation path substantially in the form of an {N, X} star polygon;
wherein:
at least one of said AMA modules in each said group common tiers being aligned out of the plane of its circumferential array to exchange laser radiation with another AMA in another group common tier, whereby amplification of the laser radiation within said optical cavity occurs with circulation of the laser energy through the AMA modules of each of the common group tiers.

18. The linear optical resonator of claim 17, wherein each said AMA module includes at least one, actively cooled solid-state laser gain medium arranged in an active mirror configuration, and a pump for providing optical pump radiation into said laser gain medium for excitation thereof.

19. The linear optical resonator of claim 17, where X=(N−1)/2.

20. A method of amplifying laser energy in an optical resonator, comprising:
providing an optical cavity, for amplifying laser radiation; and
disposing a plurality of optical elements in a circumferential array along the perimeter of said cavity, each in an allocated one of a plurality of substantially equally spaced perimeter segments, and each cooperatively aligned to receive and transmit laser radiation through said cavity along a propagation path substantially in the form of a star polygon, wherein said circumferential array of said plurality of optical elements comprises an outcoupler, an end mirror, and one or more active mirror amplifier (AMA) modules;
positioning each of said plurality of elements along the cavity perimeter at an associated one of a like plurality of vertices of said star polygon laser propagation path;
positioning said outcoupler and said end mirror at terminal vertices of said star polygon propagation path for circulating the laser radiation therebetween; and
arranging said AMA modules in operating relationship to one another at vertices intermediate thereto for amplifying the laser radiation cycling between said outcoupler and said end mirror.

* * * * *

UNITED STATES PATENT AND TRADEMARK OFFICE
CERTIFICATE OF CORRECTION

PATENT NO. : 7,609,742 B2  
APPLICATION NO. : 11/164907  
DATED : October 27, 2009  
INVENTOR(S) : David Dick It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this

Twelfth Day of October, 2010

David J. Kappos  
*Director of the United States Patent and Trademark Office*